(12) United States Patent
Yin et al.

(10) Patent No.: US 10,910,182 B2
(45) Date of Patent: Feb. 2, 2021

(54) CONTACTOR COIL CONTROL CIRCUIT

(71) Applicant: MORNSUN GUANGZHOU SCIENCE & TECHNOLOGY CO., LTD., Guangdong (CN)

(72) Inventors: Xiangyang Yin, Guangdong (CN); Shengbin Tang, Guangdong (CN); Junxi Su, Guangdong (CN)

(73) Assignee: MORNSUN GUANGZHOU SCIENCE & TECHNOLOGY CO., LTD., Guangdong (CN)

( * ) Notice: Subject to any disclaimer, the term of this patent is extended or adjusted under 35 U.S.C. 154(b) by 316 days.

(21) Appl. No.: 16/073,804

(22) PCT Filed: Aug. 31, 2016

(86) PCT No.: PCT/CN2016/097519
§ 371 (c)(1),
(2) Date: Jul. 29, 2018

(87) PCT Pub. No.: WO2018/006487
PCT Pub. Date: Jan. 11, 2018

(65) Prior Publication Data
US 2019/0035583 A1  Jan. 31, 2019

(30) Foreign Application Priority Data
Jul. 5, 2016  (CN) .......................... 2016 1 0526057

(51) Int. Cl.
| | |
|---|---|
| *H01H 47/10* | (2006.01) |
| *H01H 47/32* | (2006.01) |
| *H01H 47/00* | (2006.01) |
| *H01H 47/22* | (2006.01) |

(52) U.S. Cl.
CPC .......... *H01H 47/10* (2013.01); *H01H 47/001* (2013.01); *H01H 47/223* (2013.01); *H01H 47/32* (2013.01)

(58) Field of Classification Search
CPC .... H01H 47/10; H01H 47/001; H01H 47/223; H01H 47/32
See application file for complete search history.

(56) References Cited

U.S. PATENT DOCUMENTS 4,176,388 A * 11/1979 Palmer ................... H01H 47/32
361/194
4,450,427 A * 5/1984 Gareis ....................... G05F 7/00
324/251
(Continued)

FOREIGN PATENT DOCUMENTS

| CN | 1173722 | 2/1998 |
|---|---|---|
| CN | 1925085 | 3/2007 |

(Continued)

OTHER PUBLICATIONS

"International Search Report (Form PCT/ISA/210)", dated Apr. 7, 2017, with English translation thereof, pp. 1-4.

*Primary Examiner* — Fred E Finch, III
*Assistant Examiner* — Kevin H Sprenger
(74) *Attorney, Agent, or Firm* — JCIPRNET

(57) ABSTRACT

The present application discloses a contactor coil control circuit, including a switch control circuit, a drive circuit, a fast turn-off circuit, a diode D1, a first MOS (Metal Oxide Semiconductor) transistor TR1 and a contactor coil. The fast turn-off circuit at least includes an MOS transistor TR2 or a triode; the cathode of the diode is connected to an input voltage VIN; the anode of the diode is connected to a first port of the fast turn-off circuit; a second port of the fast turn-off circuit is connected to the drain of the first MOS transistor; the source of the first MOS transistor is grounded; one end of the contactor coil L1 is connected to an input voltage, and the other end of the contactor coil is connected to the drain of the first MOS transistor; a third port of the fast turn-off circuit is connected to an output port of the drive (Continued)

circuit; an input port of the drive circuit is connected to a first output port of the switch control circuit; and a second output port of the switch control circuit is connected to the gate of the first MOS transistor. On the premise of turning off the contactor quickly, the coil control circuit is lower in loss, adopts a fewer of devices, and is lower in cost and smaller in volume.

18 Claims, 13 Drawing Sheets

(56) References Cited

U.S. PATENT DOCUMENTS

| | | | |
|---|---|---|---|
| 5,671,115 A * | 9/1997 | Streich | H01H 47/10 361/154 |
| 2002/0041478 A1 | 4/2002 | Kanomata et al. | |
| 2010/0259861 A1 * | 10/2010 | Wendt | H01H 47/32 361/160 |
| 2011/0292558 A1 * | 12/2011 | Li | H01H 47/04 361/154 |
| 2012/0038227 A1 * | 2/2012 | West | H01H 47/001 307/139 |
| 2016/0203931 A1 * | 7/2016 | Ramsey | H01H 47/04 361/194 |
| 2016/0261127 A1 * | 9/2016 | Worry | H01M 10/4207 |
| 2017/0213677 A1 * | 7/2017 | Yu | H01H 47/223 |

FOREIGN PATENT DOCUMENTS

| | | |
|---|---|---|
| CN | 101118816 | 2/2008 |
| CN | 202126969 | 1/2012 |
| CN | 102420078 | 4/2012 |
| CN | 203607339 | 5/2014 |

* cited by examiner

CONTACTOR COIL CONTROL CIRCUIT

CROSS-REFERENCE TO RELATED APPLICATION

This application is a 371 application of an international PCT application Ser. No. PCT/CN2016/097519, filed on Aug. 31, 2016, which claims priority to and the benefit of China Patent Application No. CN201610526057.4, filed on Jul. 5, 2016, the disclosures of which are incorporated herein by reference in its entirety.

TECHNICAL FIELD

The present application relates to the field of alternating current contactors, and more particularly relates to a control circuit for a contactor coil.

DESCRIPTION OF RELATED ART

An electromagnetic control system of a traditional contactor consists of a coil which has hundreds or even thousands of turns, and an iron core. A contactor coil is actually an inductor with extremely large inductance and internal resistance. Generally, the inductance is hundreds millihenry to several henry, and the internal resistance is tens to hundreds Ohms. The whole working process of the contactor coil can be divided into three stages: pull-in, holding and turn-off. In the pull-in stage, the contactor coil can generate a relatively high electromagnetic force by relatively high pull-in current to enable a contactor contact to be closed, and this process is generally completed within 200 ms. After the contactor contact is closed, the contactor coil enters the holding stage, in which the holding current of the coil is about 1/10 of the pull-in current because excessive holding current would increase the loss of the coil. The stage that the contactor contact is opened is called the turn-off stage, in which the contactor contact is not opened until the current of the coil is dissipated. The contactor coil requires high current in the pull-in stage, and only requires relatively low current during holding. Without other control elements, the traditional contactor limits the current only through the impedance of its own coil. In consideration of the high current required by the pull-in, the impedance of the coil cannot be designed to be too high. Therefore, during the contactor holding process, current flowing through the coil is much higher than actually required current, and the redundant energy is turned into heat of the coil, resulting in waste of energy, temperature rise of the coil and reduction of the reliability of the coil. In order to solve the problem of high power consumption of the traditional contactor, there are many power-saving circuits for the contactor.

A circuit as shown in FIG. 1 is a common power-saving circuit which may adjust the current of a contactor coil 1 by adjusting the duty ratio of an MOS (Metal Oxide Semiconductor) transistor TR1. This circuit may enable the contactor coil to realize high-current pull-in and low-current holding by making the duty ratio of TR1 relatively large in the pull-in stage and relatively small in the holding stage, thereby achieving an energy-saving effect. In this circuit, a diode D1 provides a freewheel loop, having a loop voltage drop of about 0.7 V, of the coil. During normal work, the low-impedance freewheel loop is favorable for reducing the loss of the whole circuit. When in the turn-off stage, it needs to consume away the current of the coil quickly to turn off the contactor quickly. But at this time, the low-impedance freewheel loop may enable the current of the coil to remain for a relatively long time, resulting in turn-off delay of the contactor, so that it is unfavorable for fast turn-off of the contactor. It generally takes about 50 ms to turn off a traditional contactor product, but in the presence of the low-impedance freewheel loop of the coil, it would take 200 ms to turn off a contactor product with a power-saving circuit. In general application occasions, it will not cause a great impact if the turn-off time is slightly prolonged, but in some cases, it may cause a relatively serious problem if the turn-off time is prolonged. For example, a contactor for controlling a motor to rotate forward and reverse, the pull-in and release of the forward and reverse contactor must be carried out alternately, namely they may not be carried out at the same time. In case of a relatively long contactor turn-off time delay, such a phenomenon that one contactor is pulled in before the other one is completely turned off would be caused, resulting in short circuit of a power supply and causing a danger.

In order to realize a fast turn-off function, the impedance of the freewheel loop of the coil must be increased during turning off of the contactor generally by turning the impedance of the freewheel loop through a switch. For convenience, switch devices for switching the impedance of the freewheel loop are all called fast turn-off transistors in the text below. All the current contactor power-saving circuits with fast turn-off functions have certain defects. For example, in patent No. CN1925085A, the schematic diagram of fast turn-off circuit of which is as shown in FIG. 2, discloses a contactor power-saving circuit with a fast turn-off function. In the pull-in and holding stages, the fast turn-off transistor works in an amplification region. Supposing that the gate voltage is $V_{gs}$, the voltage $V_{ds}$ between the drain and the source is equal to $(V_{gth}+(I_{ds}/k))*(R_1+R_2)/R_2$, wherein $V_{gth}$ is a turn-on voltage threshold value of the MOS transistor, k is a coefficient proportional to the transconductance of the MOS transistor, and $I_{ds}$ is current between the drain and the source. In the fast turn-off stage, the fast turn-off transistor is turned off, and the coil current is quickly consumed away by a drive circuit, thus achieving a fast turn-off effect. This circuit has the disadvantages that in the pull-in and holding stages, the fast turn-off transistor works in the amplification region, and the turn-on threshold value $V_{gth}$ of the gate is generally 3.5 V or above, resulting in relatively high voltage $V_{ds}$ between the drain and the source, which is also more than 3.5 V, so that the fast turn-off transistor would consume relatively high energy during freewheeling of the contactor coil, and the loss of the power-saving circuit in the pull-in and holding stages is increased.

At the present, there is no technology for taking the MOS transistor as the fast turn-off transistor for saturated conduction under such a main power topology. Of course, it is also allowable to use one more isolated power supply, but the cost will be quite high. For example, a patent No. 201210004876.4 discloses a method for supplying power to the gate of the fast turn-off transistor with an extra isolated power supply. Although the MOS transistor TR2 may be completely conducted through this method, with an extremely small voltage drop at two ends of $V_{ds}$, the circuit may become very complicated. For the whole contactor power-saving circuit, the cost and the volume of the isolated power supply account for relatively large proportions because the isolated power supply requires devices such as an isolated transformer, a rectifying circuit and a voltage stabilizing circuit, and the isolated power supply itself is relatively high in loss as well.

SUMMARY OF THE INVENTION

The objective of the present application is to provide a contactor coil control circuit. On the premise of turning off the contactor quickly, the coil control circuit has lower loss, fewer devices, and lower in cost and smaller in volume.

In order to achieve the above-mentioned invention objective, the present application provides a contactor coil control circuit, including a switch control circuit, a drive circuit, a fast turn-off circuit, a diode, a first MOS (Metal Oxide Semiconductor) transistor and a contactor coil. The fast turn-off circuit at least includes an MOS transistor or a triode. The connection relation of the circuit of the present application is as follows: the cathode of the diode is connected to an input voltage; the anode of the diode is connected to a first port of the fast turn-off circuit; a second port of the fast turn-off circuit is connected to the drain of the first MOS transistor; the source of the first MOS transistor is grounded; one end of the contactor coil is connected to the input voltage, and the other end of the contactor coil is connected to the drain of the first MOS transistor; a third port of the fast turn-off circuit is connected to an output port of the drive circuit; an input port of the drive circuit is connected to a first output port of the switch control circuit; and a second output port of the switch control circuit is connected to the gate of the first MOS transistor.

Specifically, the contactor coil control circuit is suitable for controlling a coil of a contactor, and includes a freewheel diode D1, an MOS transistor TR1, a fast turn-off circuit, a drive circuit and a switch control circuit. The fast turn-off circuit forms a freewheel loop with the freewheel diode D1, and provides a low-impedance path for the freewheel loop in pull-in and holding stages and a high-impedance path for the freewheel loop during a switch-off stage. The drive circuit provides a drive voltage for the fast turn-off circuit. The switch control circuit controls operation of the MOS transistor TR1.

Preferably, the drive circuit drives the fast turn-off circuit to work in a saturated conduction state in the pull-in and holding stages of the coil.

Preferably, the fast turn-off circuit is an MOS transistor, and accords with a saturated conduction parameter characteristic of $V_{gs}>(V_{gth}+I_{ds}/k)$ in the pull-in and holding stages of the coil.

Preferably, the fast turn-off circuit includes an MOS transistor TR2; the drive circuit includes a capacitor C1; the switch control circuit includes an MOS transistor TR3, an MOS transistor TR4 and a current supply end; the capacitor C1 is connected in parallel between the gate and the source of the MOS transistor TR2; current from the current supply end charges the capacitor C1 through a path formed by a body diode of the MOS transistor TR4, a body diode of the MOS transistor TR2 and the MOS transistor TR1; and when the MOS transistor TR2 is conducted, the capacitor C1 continuously supplies power to the gate of the MOS transistor TR2 to enable the MOS transistor TR2 to be conducted in a saturated manner.

Preferably, the capacitor C1 of the drive circuit discharges energy through a loop formed by the MOS transistor TR4, the MOS transistor TR3, a body diode of the MOS transistor TR1 and the MOS transistor TR2 in the turn-off stage.

Preferably, the fast turn-off circuit includes a triode Q1; the drive circuit includes a resistor R1; the switch control circuit includes an MOS transistor TR3; in the pull-in and holding stages, the MOS transistor TR3 is conducted to form a path of the resistor R1 and the ground; and the resistor R1 builds base current for the triode Q1 to enable the triode Q1 to be conducted in a saturated manner.

Preferably, the switch control circuit controls the MOS transistor TR3 to be turned off in the turn-off stage, so as to enable the triode Q1 to work in an amplified state or a complete turned off state.

A coil control method of the contactor coil control circuit of the present application is as follows.

In the pull-in and holding stages, the second output port of the switch control circuit continuously outputs square wave signals to control the first MOS transistor to be turned on and turned off, and in the turn-off stage, the second output port of the switch control circuit does not output the square wave signals to control the first MOS transistor to be turned off continuously.

The fast turn-off circuit may be an MOS transistor or a triode. When a fast turn-off transistor is the MOS transistor (expressed by a second MOS transistor), the control circuit is characterized in that: in the pull-in and holding stages, at the moment that the first MOS transistor is turned off, the drive circuit controls the second MOS transistor to be conducted, and the parameter characteristic of the second MOS transistor is $V_{gs}>(V_{gth}+I_{ds}/k)$, wherein $V_{gth}$ is a turn-on voltage threshold value of the MOS transistor, k is a coefficient proportional to the transconductance of the MOS transistor, $V_{gs}$ is the gate voltage of the second MOS transistor, and $I_{ds}$ is the current between the drain and the source of the second MOS transistor. The drive circuit may set $V_{gs}$ to be 10 V or above. Under the drive voltage, the MOS transistor can be completely conducted, with extremely low conduction internal resistance $R_{dson}$; and the second MOS transistor has the power consumption of $I_{ds}^2*R_{dson}$ which is extremely low. In the turn-off stage, the drive circuit controls the gate voltage of the second MOS transistor, and the parameter characteristic of the gate voltage is $V_{gs}=(V_{gth}+I_{ds}/k)$ or $V_{gs}<V_{gth}$ to enable the second MOS transistor to be located in the amplification region or completely turned off; and the conduction internal resistance $R_{dson}$ of the second MOS transistor is extremely high to quickly consume away the energy of the contactor coil, so that the contactor may be turned off quickly.

When the fast turn-off transistor is an NPN triode (expressed by the NPN triode), the control circuit is characterized in that in the pull-in and holding stages, at the moment that the first MOS transistor is turned off, the drive circuit controls the NPN triode to be conducted, and the parameter characteristic of the NPN triode is $I_b>I_{ce}/\beta$, wherein $I_b$ is the base current of the NPN triode, $\beta$ is an amplification factor of the triode, and $I_{ce}$ is the current between the collector and the emitter of the NPN triode. In case of $I_b>I_{ce}/\beta$, the NPN triode is conducted in a saturated manner, and at the moment, a voltage drop between the collector electrode and the emitter is 0.3 V. In the turn-off stage, the drive circuit controls the base current of the NPN triode, and the parameter characteristic is $I_b=I_{ce}/\beta$ or $I_b=0$ A to enable the NPN triode to be located in the amplification region or completely turned off; at the moment, the voltage drop between the collector and the emitter is very large, and the NPN triode has the power consumption of $V_{ce}*I_{ce}$, so that the energy of the contactor coil may be consumed away quickly to enable the contactor to be turned off quickly.

The present application has the beneficial effect that on the premise of achieving the fast turn-off effect, nearly no extra loss is increased. The most important technical point of the present application is that an above-the-ground drive method which enables an MOS transistor above the ground to be conducted in a saturated manner and makes the circuit simple. Compared with an existing solution, the present application has no disadvantages.

BRIEF DESCRIPTION OF THE DRAWINGS

FIG. 3-1 is a schematic circuit diagram of a triode used as a fast turn-off transistor in the prior art.

FIG. 3-2 is a schematic circuit diagram of an MOS (Metal Oxide Semiconductor) transistor used as a fast turn-off transistor in the prior art.

DETAILED DESCRIPTION OF THE PREFERRED EMBODIMENTS

Figure 2:
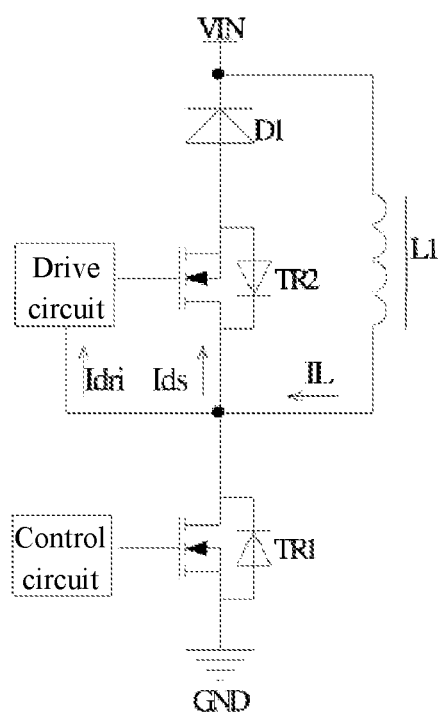
FIG. 2 is a schematic circuit diagram of a power-saving circuit with a fast turn-off function for a contactor in the prior art.

Features and disadvantages of the prior art are firstly described before the introduction of the principle of this embodiment is made. The schematic circuit block diagram of the features of the prior art is as shown in FIG. 2. In pull-in and holding stages, when an MOS (Metal Oxide Semiconductor) transistor TR1 is turned off, a fast turn-off transistor TR2 needs to be turned on to provide a freewheel loop for a contactor coil, and energy for driving quick turning off and conduction is supplied by the contactor coil. This technology is characterized in that in the pull-in and holding stages, after the MOS transistor TR1 is turned off, the current of the coil flows through a drive circuit; and after the fast turn-off transistor is driven to be turned on, the other current flows through the fast turn-off transistor. In the pull-in and holding stages, after the MOS transistor TR1 is turned off, the current flowing through the fast turn-off transistor and the drive circuit accords with the following relation: $I_L=I_{dn}+I_{ds}$. Besides, the fast turn-off transistor also has other characteristic relations. When the fast turn-off transistor adopts an NPN triode or an MOS transistor, the relation is different.

Figure 1:
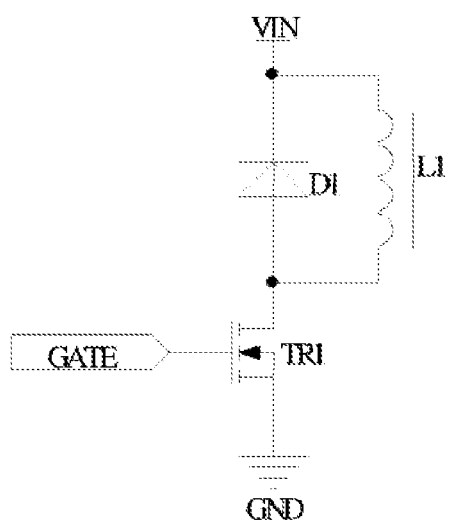
FIG. 1 is a schematic circuit diagram of a power-saving circuit without a fast turn-off function for a contactor in the prior art.
Figures 1, 3:
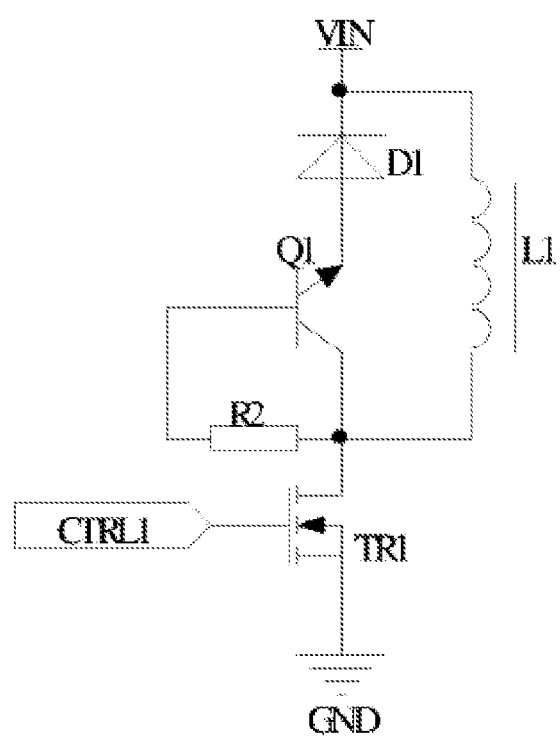
Figures 2, 3:
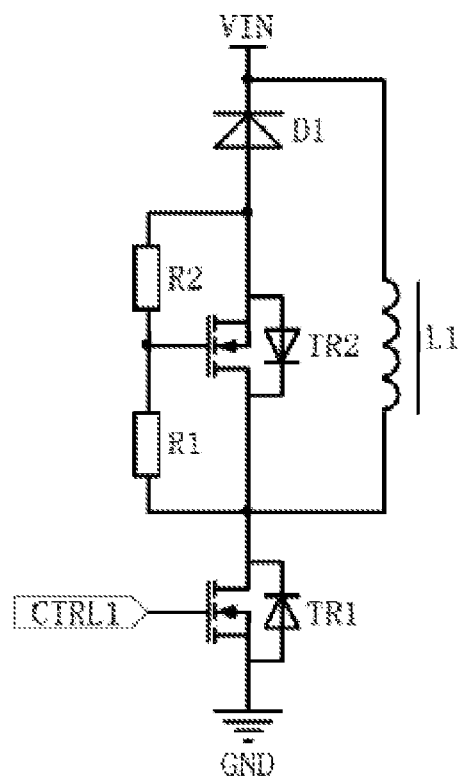

A further description will be made below to other relational characteristics of the prior art. FIG. 3-1 and FIG. 3-2 respectively show specific examples of the NPN triode and the MOS transistor in the prior art. In pull-in and holding processes, the MOS transistor TR1 is turned on and turned off at a certain frequency duty ratio. The principle of above-the-ground MOS transistor driving is that when TR1 is turned off, current of an inductor needs to be freewheeled. As the inductance of the contactor coil is relatively high, and approximates to a constant current source, when TR1 is turned off, the coil current may find other loops for freewheeling. The coil current would first flow through the base of a triode or the gate of the MOS transistor to drive the triode or the MOS transistor to be conducted. In the example of FIG. 3-1, when the NPN triode is used as the fast turn-off transistor, in the pull-in and holding processes, the base current $I_b$ and the collector current $I_{ce}$ accord with the characteristic relation of $I_{ce}=I_b*\beta$, the triode works in an amplification region all the time, and the voltage at two ends CE of the triode is relatively high. The voltage at the two ends CE of the triode Q1 is $V_{on}=V_b+(I_L/(1+\beta))*R2$, wherein $V_b$ is a bias voltage of the base, which is generally 0.7 V, and $\beta$ is the amplification factor of the triode. In FIG. 3-2, when the MOS transistor is used as the fast turn-off transistor, in the pull-in and holding processes, the gate voltage $V_{gs}$ and the drain current $I_{ds}$ of the MOS transistor accord with the relational characteristic of $V_{gs}=(V_{gth}+I_{ds}/k)$, wherein $V_{gth}$ is a turn-on voltage threshold value of the MOS transistor, which is generally 3.5 V, and k is a coefficient proportional to the transconductance of the MOS transistor. A voltage drop between the two ends DS of the MOS transistor TR2 is $V_{on}=(V_{gth}+(I_{ds}/k))*(R1+R2)/R2$. In the prior art, the energy of the fast turn-off transistor is always supplied by freewheeling current of the contactor coil, the above-mentioned formulas are always valid, the fast turn-off transistor is always in an amplified state, the voltage drop is relatively large, and the loss of the fast turn-off transistor is also relatively high during freewheeling. Persons skilled in the art cannot make the fast turn-off transistor conducted in a saturated manner under a condition of requiring relatively low cost, and cannot minimize the loss in the pull-in and holding stages of the contactor.

The beneficial effects of this embodiment will be discussed through a simple example.

In circuit structures as shown in FIG. 3-1 and FIG. 3-2, the fast turn-off transistors are in the amplified state all the time, with a relatively large conduction voltage drop. After TR1 is turned off, the coil current is freewheeled through a freewheel loop formed by the fast turn-off transistor and D1, and energy consumed by the freewheel loop is $I_L*V_{on}$.

In the example as shown in FIG. 3-1, the fast turn-off transistor is designed on the basis of optimal loss. The common amplification factor $\beta=100$ of the triode, R2=0Ω, the coil current $I_L=1$ A and $V_b=0.7$ V are substituted into the above-mentioned formula to obtain the power consumed by the fast turn-off transistor, which is 0.7 W.

In the example as shown in FIG. 3-2, in case of R1=0 Ω, R2=10 kΩ, the coil current $I_L=1$ A and $V_{gth}=3.5$ V, the loss of the fast turn-off transistor is 3.5 W.

Supposing that the fast turn-off transistor is conducted in a saturated manner, the saturated conduction voltage drop of the triode is generally 0.3 V, the conduction resistance of the MOS transistor is selected as 0.05Ω, and the coil current $I_L$ is equal to 1 A, so that it is very easy to obtain the loss of 0.3 W of the triode and the loss of 0.05 W of the MOS transistor.

The above results are obtained on the basis of the optimal loss of the fast turn-off transistor. In actual application, to enable the fast turn-off transistor to work reliably, R1 may not be valued at 0 Ω, and at the moment, the fast turn-off transistor working in the amplified state may be higher in loss. According to the standard requirements of *Minimum Allowable Values of Energy Efficiency and Energy Efficiency*

*Grades for AC Contactors* GB21518-2008, the energy efficiency grade-1 requires 1 VA or below. Apparently, even if the fast turn-off transistor works in the amplified state, it is relatively hard to realize the energy efficiency grade-1. Even if the triode is adopted to work in a saturated state, the energy efficiency grade is not very ideal either. The most ideal solution is to take the MOS transistor as the fast turn-off transistor and enable the MOS transistor to be conducted in the saturated manner in the pull-in and holding stages.

TABLE 1

Contrast of losses of the fast turn-off transistor in various cases

| | Triode in amplified state | MOS transistor in amplified state | MOS transistor in saturated state |
|---|---|---|---|
| Loss | 0.7 W | 3.5 W | 0.05 W |

First Embodiment

Figure 4:
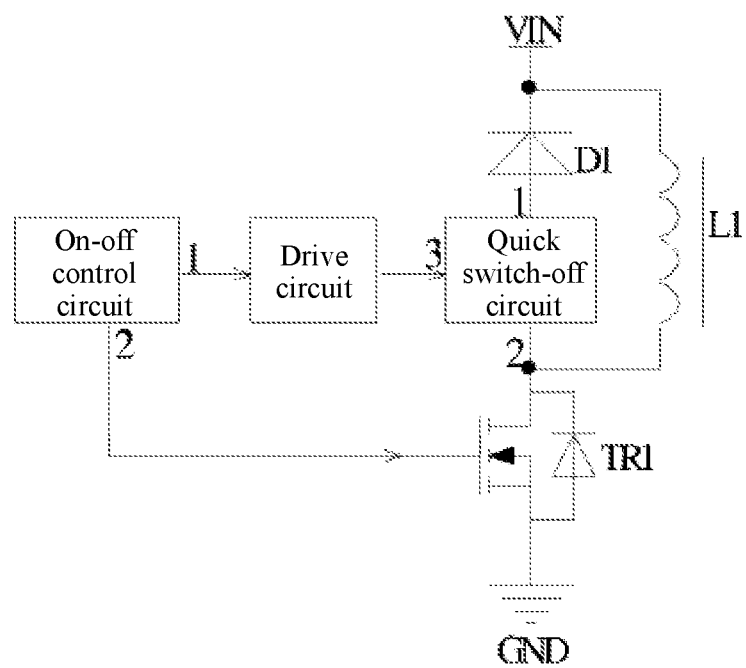
FIG. 4 is a schematic circuit block diagram of the present application.
Figure 5:
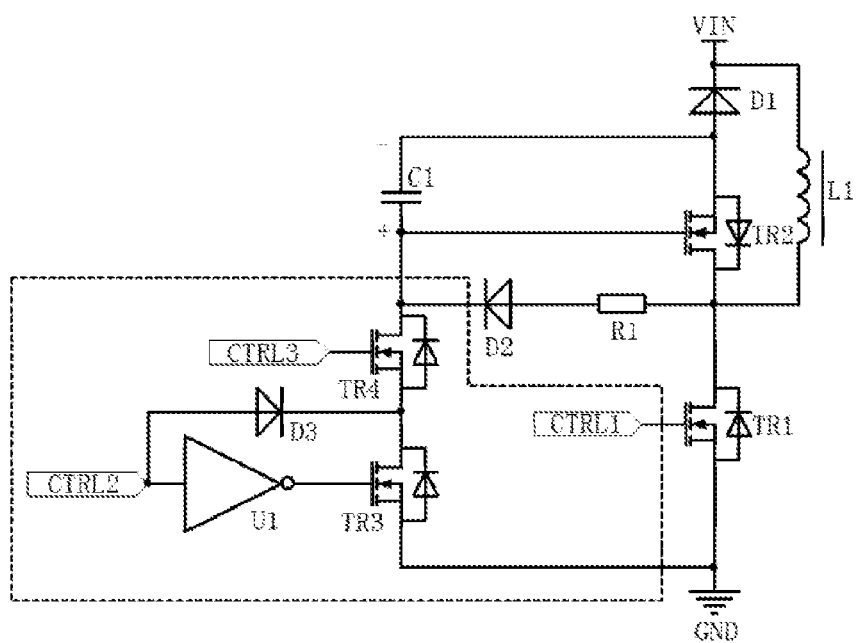
FIG. 5 is a schematic circuit diagram of a first embodiment of the present application.

The schematic circuit block diagram of a contactor coil control circuit of the present application is as shown in FIG. 4. A first embodiment of the contactor coil control circuit of the present application is as shown in FIG. 5. The contactor coil control circuit includes a switch control circuit, a drive circuit, a fast turn-off circuit, a diode D1, an MOS (Metal Oxide Semiconductor) transistor TR1 and a contactor coil L1. The fast turn-off circuit includes an MOS transistor TR2; the drive circuit includes a capacitor C1, a diode D2 and a resistor R1; and the switch control circuit includes a diode D3, an inverter U1, an MOS transistor TR3, an MOS transistor TR4, a first signal port CTRL1, a second signal port CTRL2 and a third signal port CTRL3.

The connection relation of all the devices of the first embodiment is as follows: the cathode of the diode D1 is connected to an input voltage VIN, and the anode of the diode D1 is connected to the source of the MOS transistor TR2; the drain of the MOS transistor TR2 is connected to the drain of the MOS transistor TR1; the source of the MOS transistor TR1 is grounded; one end of the contactor coil L1 is connected to the input voltage VIN, and the other end of the contactor coil L1 is connected to the drain of the MOS transistor TR1; and the gate of the MOS transistor TR1 is connected to the first signal port CTRL1. The capacitor C1 is connected in parallel to the gate and the source of the MOS transistor TR2; the cathode of the diode D2 is connected to the gate of the MOS transistor TR2; and the resistor R1 is connected between the anode of the diode D2 and the drain of the MOS transistor TR2. The drain of the MOS transistor TR4 is connected to the gate of the MOS transistor TR2; the gate of the MOS transistor TR4 is connected to the third signal port CTRL3; the source of the MOS transistor TR4 is connected to the drain of the MOS transistor TR3, and is also connected to the cathode of the diode D3; the source of the MOS transistor TR3 is grounded; the second signal port CTRL2 is connected to the anode of the diode D3 and the input end of the inverter U1 respectively; and an output of the inverter U1 is connected to the gate of the MOS transistor TR3.

A control method of the first embodiment is as follows.

In the pull-in and holding stages, the first signal port CTRL1 continuously outputs square wave signals to control the MOS transistor TR1 to be turned on and turned off continuously, and the third signal port CTRL3 continuously inputs low level signals to enable the MOS transistor TR4 to be turned off continuously. In the turn-off stage, the first signal port CTRL1 does not output the square wave signals to control the MOS transistor TR1 to be turned off continuously, and the third signal port CTRL3 inputs high level signals to enable the MOS transistor TR4 to be turned on continuously.

The second signal port CTRL2 has the characteristics that: in the contactor pull-in and holding stages, the second signal port CTRL2 is at a high level; when the MOS transistor TR1 is conducted, the current from the second signal port CTRL2 charges the capacitor C1 through a loop formed by a body diode of the MOS transistor TR4, a body diode of the MOS transistor TR2 and the MOS transistor TR1, and the voltage of the capacitor C1 is approximately equal to that of the second signal port CTRL2. The capacitor C1 continuously supplies power to the gate of the MOS transistor TR2, so that the MOS transistor TR2 may work in a completely saturated conduction state, with extremely low loss. In the contactor turn-off stage, the second signal port CTRL2 is at a low level, and controls the MOS transistor TR3 to be conducted, and the power of the capacitor C1 is quickly discharged through a loop formed by the MOS transistor TR4, the MOS transistor TR3, a body diode of the MOS transistor TR1 and the MOS transistor TR2. At the moment, the drive energy of the MOS transistor TR2 is supplied by freewheeling current of the contactor coil; the gate voltage $V_{gs}$ and the drain current $I_{ds}$ of the MOS transistor TR2 accord with the relational characteristic of $V_{gs}=(V_{gth}+I_{ds}/k)$; and the MOS transistor TR2 works in an amplification region, and a voltage drop between the drain and the source is equal to $V_{gs}$. The power of the contactor coil L1 is quickly consumed away by the MOS transistor TR2 to achieve a fast turn-off effect. In this embodiment, the second signal port CTRL2 may be a current supply end of the capacitor C1, and in other embodiments, the current supply end of the capacitor C1 may also be an individually disposed power supply port to realize the same or similar function, namely to supply energy to the capacitor C1 to enable the voltage of the capacitor C1 to be much higher than the turn-on threshold value of the fast turn-off transistor and enable the fast turn-off transistor to be conducted in a saturated manner.

The dash-line area in FIG. 5 are all integrated in a chip, and the capacitor C1, the resistor R1 and the diode D2 are all low-power surface-mounted devices, which are extremely low in cost and extremely small in volume. In the pull-in and holding processes, the MOS transistors work in a completely conducted state all the time, with nearly ignorable loss. By the adoption of the method of the present application, a very good effect can be achieved.

Second Embodiment

Figure 6:
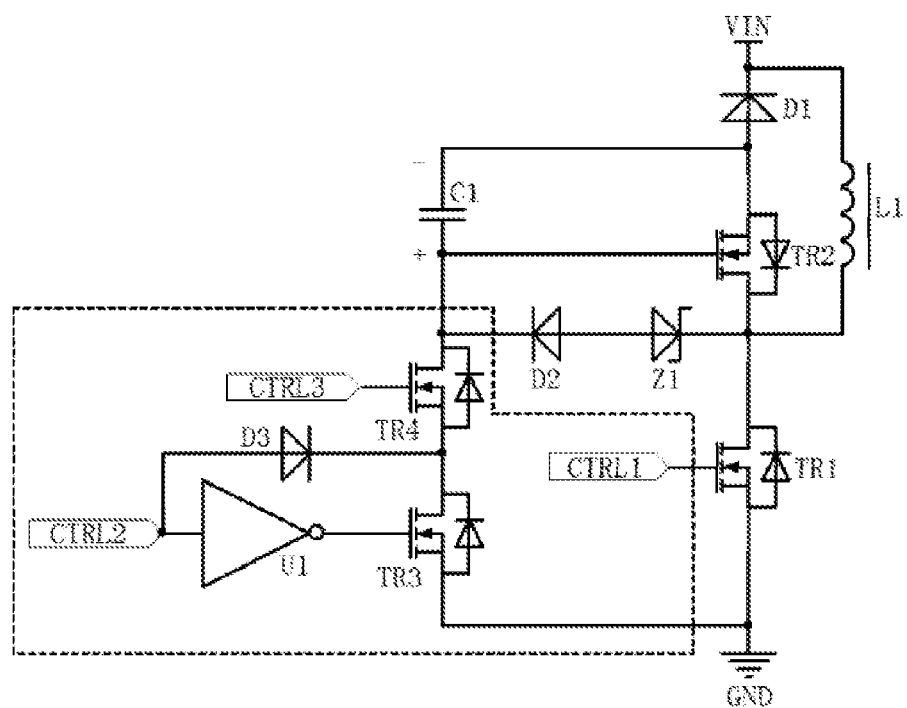
FIG. 6 is a schematic circuit diagram of a second embodiment of the present application.

The schematic circuit diagram of a contactor coil control circuit of a second embodiment of the present application is as shown in FIG. 6. The circuit and the control method are both similar to those of the first embodiment. A difference between this embodiment and the first embodiment is that a voltage stabilizing diode Z1 replaces the resistor R1 in the first embodiment. In the contactor pull-in and holding states, the working process of the circuit is the same as that of the first embodiment; in the turn-off stage, the MOS transistor TR2 works in the amplification region; and the gate voltage $V_{gs}$ and the drain current $I_{ds}$ of the MOS transistor TR2 accord with the relational characteristic of $V_{gs}=(V_{gth}+I_{ds}/k)$, and a voltage drop between the drain and the source is equal to $V_{gs}+V_z$, wherein $V_z$ is the voltage of the voltage stabilizing diode Z1. In the second embodiment, the voltage drop between the drain and the source of the MOS transistor TR2 is larger in the fast turn-off stage, so that the contactor is turned off more quickly.

Third Embodiment

Figure 7:
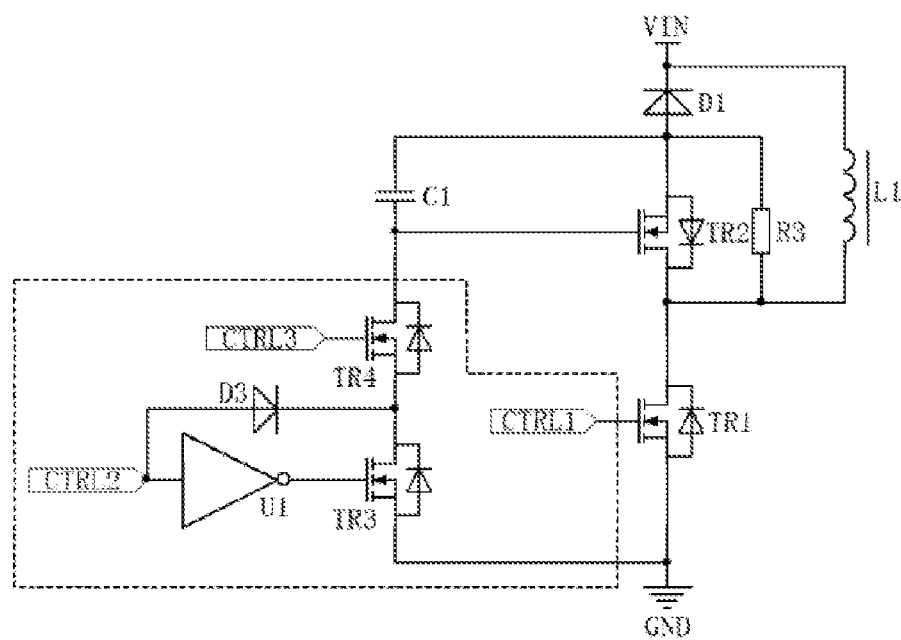
FIG. 7 is a schematic circuit diagram of a third embodiment of the present application.

The schematic circuit diagram of a contactor coil control circuit of a third embodiment of the present application is as shown in FIG. 7. The circuit and the control method are both similar to those of the first embodiment. A difference between this embodiment and the first embodiment is that the resistor R1 in the first embodiment is not provided in this embodiment, but a power resistor R3 is connected in parallel to the drain and the source of the MOS transistor TR2. In the contactor pull-in and holding states, the working process of the circuit is the same as that of the first embodiment; and in the turn-off stage, the MOS transistor TR2 is completely turned off, and the power of the contactor coil is quickly consumed away by the power resistor R3, so that the larger the resistance value of the resistor R3 is, the quicker the contactor will be turned off.

Fourth Embodiment

Figure 8:
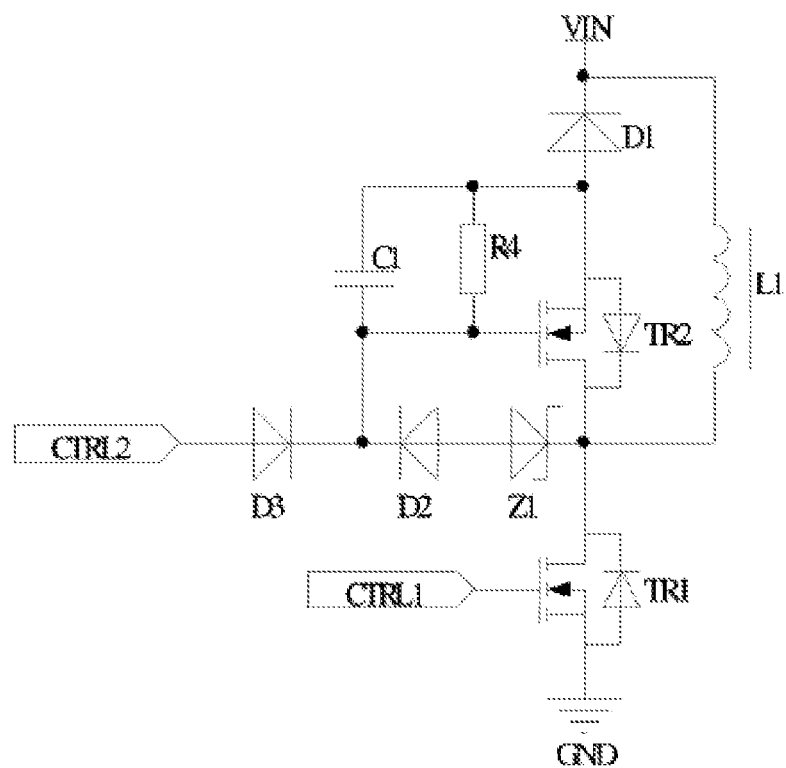
FIG. 8 is a schematic circuit diagram of a fourth embodiment of the present application.

The schematic circuit diagram of a contactor coil control circuit of a fourth embodiment of the present application is as shown in FIG. 8. The contactor coil control circuit includes a switch control circuit, a drive circuit, a fast turn-off circuit, a diode D1, an MOS transistor TR1 and a contactor coil L1. The fast turn-off circuit includes an MOS transistor TR2; the drive circuit includes a capacitor C1, a resistor R4, a diode D2 and a voltage stabilizing diode Z1; and the switch control circuit includes a diode D3, a first signal port CTRL1 and a second signal port CTRL2.

The connection relation of all the devices of the fourth embodiment is as follows: the cathode of the diode D1 is connected to an input voltage VIN, and the anode of the diode D1 is connected to the source of the MOS transistor TR2; the drain of the MOS transistor TR2 is connected to the drain of the MOS transistor TR1; the source of the MOS transistor TR1 is grounded; one end of the contactor coil L1 is connected to the input voltage VIN, and the other end of the contactor coil L1 is connected to the drain of the MOS transistor TR1; and the gate of the MOS transistor TR1 is connected to the first signal port CTRL1. The capacitor C1 and the resistor R4 are connected in parallel to the gate and the source of the MOS transistor TR2; and after being connected in series, the diode D2 and the voltage stabilizing diode Z1 are connected in parallel to the gate and the drain of the MOS transistor TR2. The cathode of the diode D3 is connected to the cathode of the diode D2, and the anode of the diode D3 is connected to the second signal port CTRL2.

A control method of the fourth embodiment is as follows.

In the pull-in and holding stages, the first signal port CTRL1 continuously outputs square wave signals to control the MOS transistor TR1 to be turned on and turned off continuously. In the turn-off stage, the first signal port CTRL1 does not output the square wave signals to control the MOS transistor TR1 to be turned off continuously.

The second signal port CTRL2 has the characteristics that: in the contactor pull-in and holding stages, the second signal port CTRL2 is at a high level; when the MOS transistor TR1 is conducted, the current from the second signal port CTRL2 charges the capacitor C1 through a loop formed by the diode D3, the capacitor C1, a body diode of the MOS transistor TR2 and the MOS transistor TR1. The capacitor C1 continuously supplies power to the gate of the MOS transistor TR2 to enable the MOS transistor TR2 to be conducted in a saturated manner, with extremely low loss. In the contactor turn-off stage, the second signal port CTRL2 is at a low level, the power of the capacitor C1 is consumed away by the resistor R4, the MOS transistors work in an amplification region, and a voltage drop between the drain and the source of the MOS transistor TR2 is equal to $V_{gs}+V_z$. The contactor coil is demagnetized at a relatively high voltage, so that its power is quickly consumed away by the MOS transistors to achieve a fast turn-off effect. A current supply end of the capacitor C1 may be either the second signal port CTRL2 or an individually disposed power supply port.

Fifth Embodiment

Figure 9:
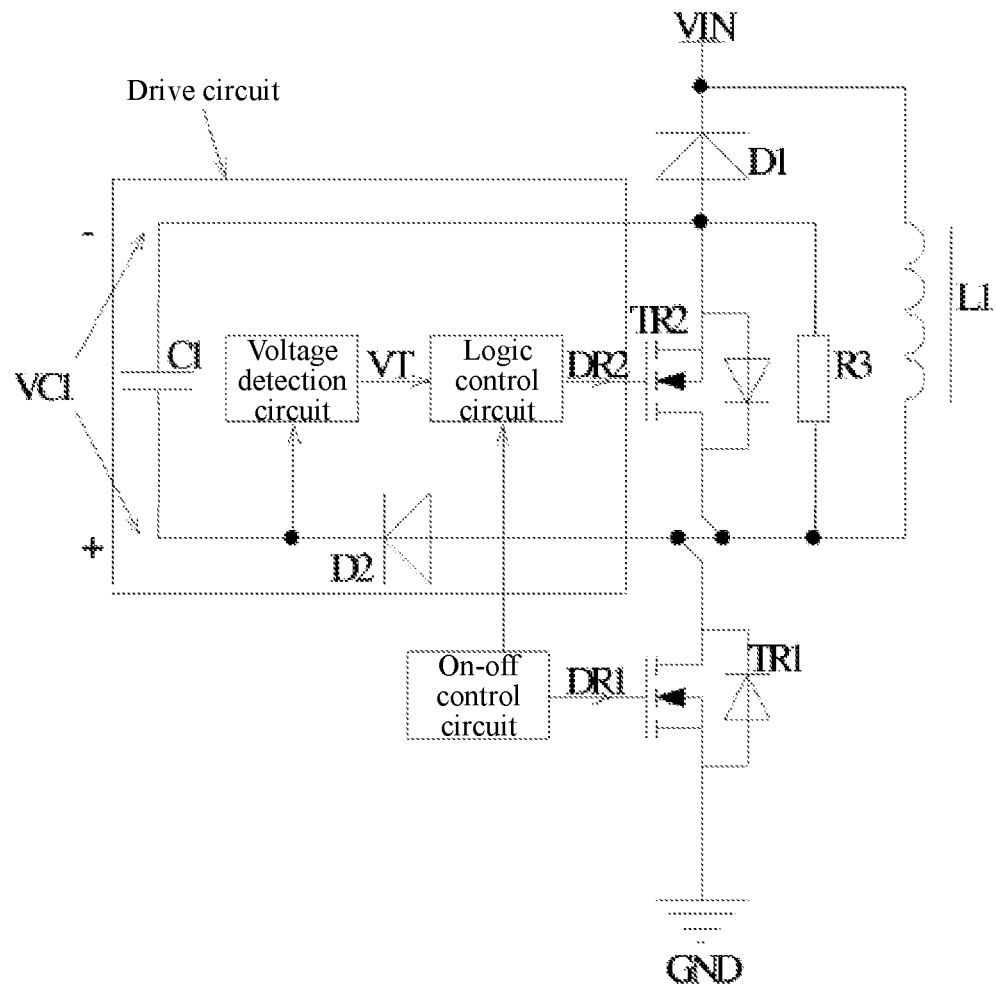
FIG. 9 is a schematic circuit diagram of a fifth embodiment of the present application.

FIG. 9 is the schematic circuit diagram of a contactor coil control circuit of a fifth embodiment of the present application. The contactor coil control circuit includes a switch control circuit, a drive circuit, a fast turn-off circuit, a diode D1, an MOS transistor TR1 and a contactor coil L1. The fast turn-off circuit includes an MOS transistor TR2 and a resistor R3; and the drive circuit includes a capacitor C1, a diode D2, a voltage detection circuit and a logic control circuit.

The connection relation of all the devices of the fifth embodiment is as follows: the cathode of the diode D1 is connected to an input voltage VIN, and the anode of the diode D1 is connected to the source of the MOS transistor TR2; the drain of the MOS transistor TR2 is connected to the drain of the MOS transistor TR1; the resistor R3 is connected in parallel to the drain and the source of the MOS transistor; the source of the MOS transistor TR1 is grounded; and one end of the contactor coil L1 is connected to the input voltage VIN, and the other end of the contactor coil L1 is connected to the drain of the MOS transistor TR1. The anode of the diode D2 is connected to the drain of the MOS transistor TR1, and the cathode of the diode is connected to one end of the capacitor C1; the other end of the capacitor C1 is connected to the source of the MOS transistor TR2; the input end of the voltage detection circuit is connected to the cathode of the diode D2; the output port of the voltage detection circuit is connected to a first input port of the logic control circuit; and an output port of the logic control circuit is connected to the gate of the MOS transistor TR2. A first output port of the switch control circuit is connected to the gate of the MOS transistor TR1, and a second output port of the switch control circuit is connected to a second input port of the logic control circuit.

A control method of the fifth embodiment is as follows.

In the pull-in and holding stages, the first output port of the switch control circuit continuously outputs square wave signals to control the MOS transistor TR1 to be turned on and turned off continuously. In the turn-off stage, the first output port of the switch control circuit does not output the square wave signals to control the MOS transistor TR1 to be turned off continuously.

The voltage detection circuit has the control characteristics that: the voltage detection circuit detects the voltage at two ends of the capacitor C1; when the voltage at the two ends of the capacitor is higher than a threshold value VTH1, the voltage detection circuit outputs a high level; and when the voltage at the two ends of the capacitor is lower than the threshold value VTH1, the voltage detection circuit outputs a low level.

Figure 10:
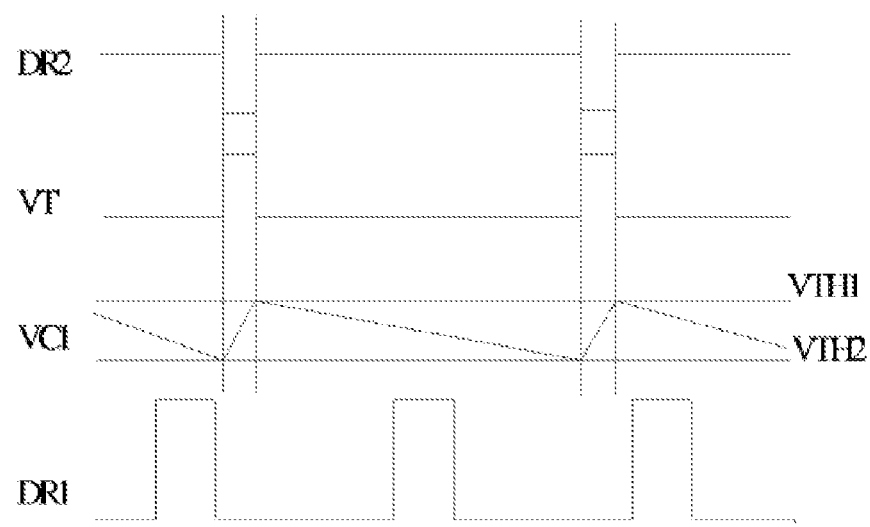
FIG. 10 is a logical sequence diagram of the fifth embodiment of the present application.

The logic control circuit has the control characteristics that: in the pull-in and holding stages, when the voltage detection circuit outputs the low level, the logic control circuit controls the MOS transistor TR2 to be completely conducted; and when the voltage detection circuit outputs the high level, the logic control circuit controls the MOS transistor TR2 to be completely turned off to enable the freewheeling current of the contactor coil L1 to charge the capacitor C1. The logic sequence of the circuit is as shown in FIG. 10.

During contactor coil freewheeling, supposing that the MOS transistor TR2 is not conducted, the coil current will charge the capacitor C1, and at the moment, the voltage of the capacitor is $V_c = I_L * t/C1$. The voltage on the capacitor C1 is controlled by the voltage detection circuit, and may be much higher than the turn-on voltage threshold value of the gate of the MOS transistor, so that a drive voltage DR2 may enable the MOS transistor TR2 to be completely conducted, with extremely low loss. The capacitor C1 and the diode D2 are both low-power surface-mounted devices, and the voltage detection circuit, the logic control circuit and the switch control circuit may be integrated in one chip, so that the whole circuit is extremely low in cost and extremely small in volume.

Sixth Embodiment

Figure 11:
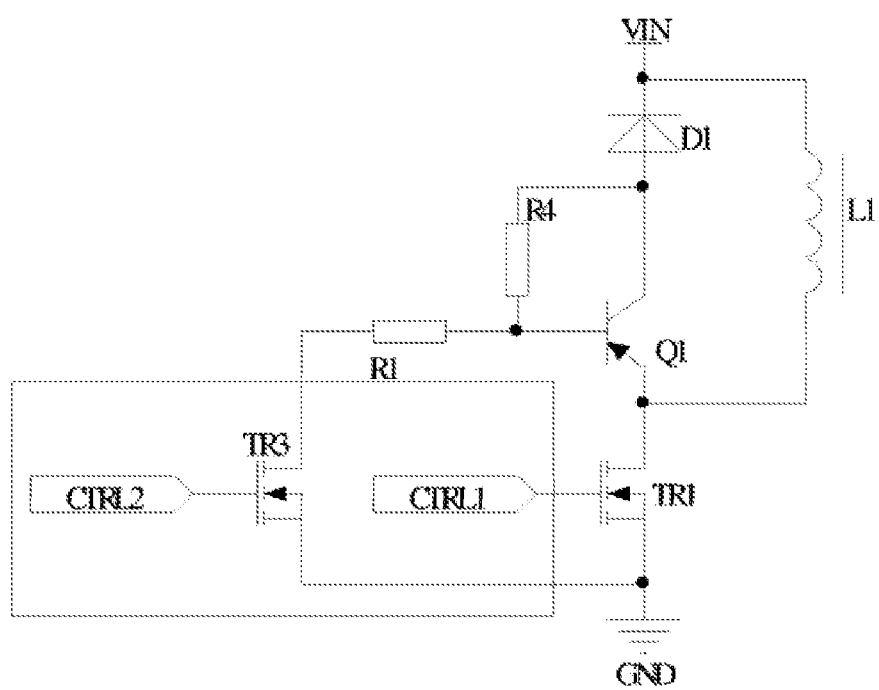
FIG. 11 is a schematic circuit diagram of a sixth embodiment of the present application.

The schematic circuit diagram of a contactor coil control circuit of a sixth embodiment of the present application is as shown in FIG. 11. The contactor coil control circuit includes a switch control circuit, a drive circuit, a fast turn-off circuit, a diode D1, an MOS transistor TR1 and a contactor coil L1. The switch control circuit includes an MOS transistor TR3, a first signal port CTRL1 and a second signal port CTRL2; the drive circuit includes a resistor R1 and a resistor R4; and the fast turn-off circuit includes a PNP triode Q1.

The connection relation of all the devices of the sixth embodiment is as follows: the cathode of the diode D1 is connected to an input voltage VIN, and the anode of the diode D1 is connected to the collector of the PNP triode Q1; the emitter of the PNP triode Q1 is connected to the drain of the MOS transistor TR1; the source of the MOS transistor TR1 is grounded; one end of the contactor coil L1 is connected to the input voltage VIN, and the other end of the contactor coil L1 is connected to the drain of the MOS transistor TR1; and the gate of the MOS transistor TR1 is connected to the first signal port CTRL1. The resistor R4 is connected between the base and the collector of the PNP triode Q1; the resistor R1 is connected between the base of the PNP triode Q1 and the drain of the MOS transistor TR3; the source of the MOS transistor TR3 is grounded; and the gate of the MOS transistor TR3 is connected to the second signal port CTRL2.

A control method of the sixth embodiment is as follows.

In the pull-in and holding stages, the first signal port CTRL1 continuously outputs square wave signals to control the MOS transistor TR1 to be turned on and turned off continuously. In the turn-off stage, the first signal port CTRL1 does not output the square wave signals to control the MOS transistor TR1 to be turned off continuously.

The second signal port CTRL2 has the characteristics that: in the pull-in and holding stages, the second signal port CTRL2 controls the MOS transistor TR3 to be conducted; when the MOS transistor TR1 is turned off, the current of the contactor coil may flow through the base of the PNP triode and the resistor R1 and then flow into the ground to enable the PNP triode to be conducted. Preferably, the resistance value of the resistor R1 accords with $R_1 <= V_{in}*(1+\beta)/I_{L1}$, wherein $V_{in}$ is an input voltage value, $\beta$ is the amplification factor of the PNP triode, and $I_{L1}$ is a current value of the contactor coil; the PNP triode Q1 works in a saturation region, with extremely low loss. In the turn-off stage, the second signal port CTRL2 controls the MOS transistor TR2 to be turned off, and the PNP triode Q1 will work in an amplification region.

The dash-line area in FIG. 11 may be implemented by means of integrated circuits, and the resistors R1 and R4 are both low-power surface-mounted devices, which are extremely low in cost and extremely small in volume.

Seventh Embodiment

Figure 12:
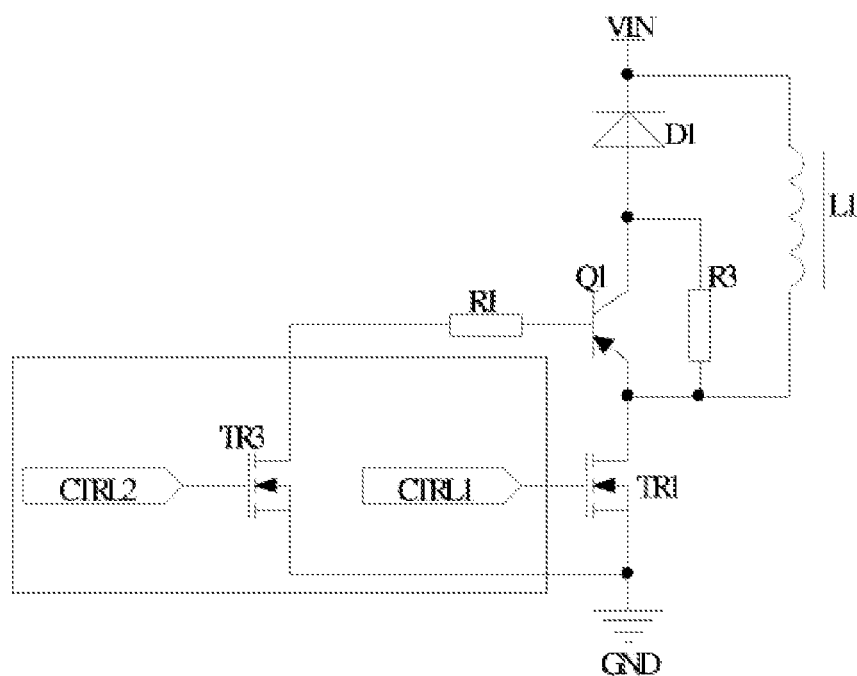
FIG. 12 is a schematic circuit diagram of a seventh embodiment of the present application.

The schematic circuit diagram of a contactor coil control circuit of a seventh embodiment is as shown in FIG. 12. The contactor coil control circuit and a control method thereof are similar to those of the sixth embodiment. A different between this embodiment and the sixth embodiment is that the resistor R3 is connected in parallel to the collector and the emitter of the PNP triode. Q1 is completely turned off, and the current of the contactor coil is quickly discharged through R3. Other working principles are completely the same as those of the fifth embodiment.

The dash-line area in FIG. 12 may be implemented by means of integrated circuits, and the resistors R1 and R4 are both low-power surface-mounted devices, which are extremely low in cost and extremely small in volume.

The above descriptions are only preferred implementation modes of the present application. It should be noted that the above-mentioned preferred implementation modes shall not be deemed as limitations to the present application, and the scope of protection of the present application shall be based on the scope defined by claims. Ordinary persons skilled in the art further can make a plurality of improvements and embellishments that shall also fall within the scope of protection of the present application without departing from the spirit and scope of the present application.

The invention claimed is:

1. A contactor coil control circuit, suitable for controlling a coil of the contactor, comprising:
a first freewheel diode and a first MOS (Metal Oxide Semiconductor) transistor, further comprising a fast turn-off circuit, a drive circuit and a switch control circuit,
the fast turn-off circuit, which forms a freewheel loop with the first freewheel diode, and is configured to provide a low-impedance path for the freewheel loop in pull-in and holding stages and provide a high-impedance path for the freewheel loop in a turn-off stage;
the drive circuit, which is configured to provide a drive voltage for the fast turn-off circuit;
the switch control circuit, which is configured to control the operation of the first MOS transistor,
wherein the fast turn-off circuit comprises a second MOS transistor; the drive circuit comprises a first capacitor; the switch control circuit comprises a third MOS transistor, a fourth MOS transistor and a current supply end; the first capacitor is connected in parallel between the gate and the source of the second MOS transistor; the current from the current supply end charges the first capacitor through a path formed by a body diode of the fourth MOS transistor, a body diode of the second MOS transistor and the first MOS transistor; and when the second MOS transistor is conducted, the first capacitor continuously supplies power to the gate of the second MOS transistor to enable the second MOS transistor to be conducted in a saturated manner.

2. The contactor coil control circuit according to claim 1, wherein the drive circuit drives the fast turn-off circuit to work in a saturated conduction state in the pull-in and holding stages of the coil.

3. The contactor coil control circuit according to claim 1, wherein the fast turn-off circuit is an MOS transistor, and accords with the saturated conduction parameter characteristic of $V_{gs}>(V_{gth}+I_{ds}/k)$ in the pull-in and holding stages of the coil, wherein $V_{gs}$ is the gate voltage of the MOS transistor, $V_{gt}$ is a turn-on voltage threshold value of the MOS transistor, $I_{ds}$ is a current between the drain and the source of the MOS transistor and k is a coefficient proportional to the transconductance of the MOS transistor.

4. The contactor coil control circuit according to claim 1, wherein the first capacitor of the drive circuit discharges energy through a loop formed by the body diodes of the fourth MOS transistor, the third MOS transistor and the first MOS transistor and the second MOS transistor in the turn-off stage.

5. The contactor coil control circuit according to claim 1, wherein the fast turn-off circuit comprises the second MOS transistor; the cathode of the freewheel diode is connected to an input voltage, and the anode of the freewheel diode is connected to the source of the second MOS transistor; the drain of the second MOS transistor is connected to the drain of the first MOS transistor; and the source of the first MOS transistor is grounded.

6. The contactor coil control circuit according to claim 5, wherein the drive circuit comprises the first capacitor, a second diode and a first resistor; the first capacitor is connected in parallel to the gate and the source of the second MOS transistor; the cathode of the second diode is connected to the gate of the second MOS transistor; and the first resistor is connected between the anode of the second diode and the drain of the second MOS transistor.

7. The contactor coil control circuit according to claim 6, wherein the switch control circuit comprises a third diode, an inverter, the third MOS transistor, the fourth MOS transistor, a first signal port, a second signal port and a third signal port; the drain of the fourth MOS transistor is connected to the gate of the second MOS transistor; the gate of the fourth MOS transistor is connected to the third signal port; the source of the fourth MOS transistor is connected to the drain of the third MOS transistor, and is also connected to the cathode of the third diode; the source of the third MOS transistor is grounded; the second signal port is connected to the anode of the third diode and the input end of the inverter respectively; and an output of the inverter is connected to the gate of the third MOS transistor.

8. The contactor coil control circuit according to claim 5, wherein the drive circuit comprises the first capacitor, a second diode and a voltage stabilizing diode; the first capacitor is connected in parallel to the gate and the source of the second MOS transistor; the cathode of the voltage stabilizing diode is connected to the drain of the second MOS transistor; the anode of the voltage stabilizing diode is connected to the anode of the second diode; and the cathode of the second diode is connected to the gate of the second MOS transistor.

9. The contactor coil control circuit according to claim 5, wherein the drive circuit comprises the first capacitor which is connected in parallel to the gate and the source of the second MOS transistor; and the fast turn-off circuit further comprises a third resistor which is connected in parallel to the drain and the source of the second MOS transistor.

10. A contactor coil control circuit, suitable for controlling a coil of the contactor, comprising:
a first freewheel diode and a first MOS (Metal Oxide Semiconductor) transistor, further comprising a fast turn-off circuit, a drive circuit and a switch control circuit,
the fast turn-off circuit, which forms a freewheel loop with the first freewheel diode, and is configured to provide a low-impedance path for the freewheel loop in pull-in and holding stages and provide a high-impedance path for the freewheel loop in a turn-off stage;
the drive circuit, which is configured to provide a drive voltage for the fast turn-off circuit;
the switch control circuit, which is configured to control the operation of the first MOS transistor,
wherein the fast turn-off circuit comprises a first triode; the drive circuit comprises a first resistor; the switch control circuit comprises a third MOS transistor; in the pull-in and holding stages, the third MOS transistor is conducted to form a path of the first resistor and the ground; and the first resistor builds the base current of the first triode to enable the first triode to be conducted in a saturated manner.

11. The contactor coil control circuit according to claim 10, wherein the triode accords with the saturated conduction parameter characteristic of $I_b>I_{ce}/\beta$ in the pull-in and holding stages of the coil, wherein Ib is the base current of the triode, $\beta$ is an amplification factor of the triode, and Ice is the current between the collector and the emitter of the triode.

12. The contactor coil control circuit according to claim 10, wherein the switch control circuit controls the third MOS transistor to be turned off in the turn-off stage to enable the first triode to work in an amplified state or a completely turned off state.

13. A contactor coil control circuit, suitable for controlling a coil of the contactor, comprising:
a first freewheel diode and a first MOS (Metal Oxide Semiconductor) transistor, further comprising a fast turn-off circuit, a drive circuit and a switch control circuit,
the fast turn-off circuit, which forms a freewheel loop with the first freewheel diode, and is configured to provide a low-impedance path for the freewheel loop in pull-in and holding stages and provide a high-impedance path for the freewheel loop in a turn-off stage;
the drive circuit, which is configured to provide a drive voltage for the fast turn-off circuit;
the switch control circuit, which is configured to control the operation of the first MOS transistor,
wherein the fast turn-off circuit comprises the second MOS transistor; the cathode of the freewheel diode is connected to an input voltage, and the anode of the freewheel diode is connected to the source of the second MOS transistor; the drain of the second MOS transistor is connected to the drain of the first MOS transistor; and the source of the first MOS transistor is grounded,
wherein the drive circuit comprises a first capacitor, a second diode, a fourth resistor and a voltage stabilizing diode; the first capacitor and the fourth resistor are connected in parallel to the gate and the source of the second MOS transistor; the cathode of the voltage stabilizing diode is connected to the drain of the second MOS transistor; the anode of the voltage stabilizing diode is connected to the anode of the second diode; and the cathode of the second diode is connected to the gate of the second MOS transistor, wherein the switch control circuit comprises a third diode, a first signal port and a second signal port; the cathode of the third diode is connected to the cathode of the second diode; the anode of the third diode is connected to the second signal port; and the first signal port is connected to the gate of the first MOS transistor.

14. A contactor coil control circuit, suitable for controlling a coil of the contactor, comprising:

a first freewheel diode and a first MOS (Metal Oxide Semiconductor) transistor, further comprising a fast turn-off circuit, a drive circuit and a switch control circuit, the fast turn-off circuit, which forms a freewheel loop with the first freewheel diode, and is configured to provide a low-impedance path for the freewheel loop in pull-in and holding stages and provide a high-impedance path for the freewheel loop in a turn-off stage;

the drive circuit, which is configured to provide a drive voltage for the fast turn-off circuit;

the switch control circuit, which is configured to control the operation of the first MOS transistor, wherein the fast turn-off circuit comprises the second MOS transistor; the cathode of the freewheel diode is connected to an input voltage, and the anode of the freewheel diode is connected to the source of the second MOS transistor; the drain of the second MOS transistor is connected to the drain of the first MOS transistor; and the source of the first MOS transistor is grounded, wherein the drive circuit comprises a logic control circuit, a voltage detection circuit, a second diode and a first capacitor; the anode of the second diode is connected to the drain of the first MOS transistor; the cathode of the diode is connected to one end of the first capacitor; the other end of the first capacitor is connected to the source of the second MOS transistor; the input end of the voltage detection circuit is connected to the cathode of the second diode; the output end of the voltage detection circuit is connected to a first input port of the logic control circuit; an output port of the logic control circuit is connected to the gate of the second MOS transistor; and the fast turn-off circuit further comprises a third resistor which is connected in parallel to the drain and the source of the second MOS transistor.

15. The contactor coil control circuit according to claim 14, wherein the voltage detection circuit detects a voltage at two ends of the first capacitor; when the voltage at the two ends of the first capacitor is higher than an internal threshold value of the voltage detection circuit, the logic control circuit outputs a high level signal to enable the second MOS transistor to be conducted; when the voltage at the two ends of the first capacitor is lower than an internal threshold value of the voltage detection circuit, the logic control circuit inputs a low level signal to enable the second MOS transistor to be turned off.

16. A contactor coil control circuit, suitable for controlling a coil of the contactor, comprising:

a first freewheel diode and a first MOS (Metal Oxide Semiconductor) transistor, further comprising a fast turn-off circuit, a drive circuit and a switch control circuit, the fast turn-off circuit, which forms a freewheel loop with the first freewheel diode, and is configured to provide a low-impedance path for the freewheel loop in pull-in and holding stages and provide a high-impedance path for the freewheel loop in a turn-off stage;

the drive circuit, which is configured to provide a drive voltage for the fast turn-off circuit;

the switch control circuit, which is configured to control the operation of the first MOS transistor, wherein the fast turn-off circuit comprises a PNP triode, wherein the drive circuit comprises a first resistor and a fourth resistor; the fourth resistor is connected between the base and the collector of the PNP triode; and the first resistor is connected between the base of the PNP triode and the drain of the second third MOS transistor.

17. A contactor coil control circuit, suitable for controlling a coil of the contactor, comprising:

a first freewheel diode and a first MOS (Metal Oxide Semiconductor) transistor, further comprising a fast turn-off circuit, a drive circuit and a switch control circuit, the fast turn-off circuit, which forms a freewheel loop with the first freewheel diode, and is configured to provide a low-impedance path for the freewheel loop in pull-in and holding stages and provide a high-impedance path for the freewheel loop in a turn-off stage;

the drive circuit, which is configured to provide a drive voltage for the fast turn-off circuit;

the switch control circuit, which is configured to control the operation of the first MOS transistor, wherein the fast turn-off circuit comprises a PNP triode, wherein the drive circuit comprises a first resistor which is connected between the base of the PNP triode and the drain of the third MOS transistor; and the fast turn-off circuit further comprises a third resistor which is connected in parallel to the collector and the emitter of the PNP triode.

18. The contactor coil control circuit according to-claim 16, wherein the switch control circuit comprises a third MOS transistor, a first signal port and a second signal port; the source of the third MOS transistor is grounded; the gate of the MOS transistor is connected to the second signal port; and the first signal port is connected to the gate of the first MOS transistor.

* * * * *